United States Patent [19]

Hanna, Jr. et al.

[11] 4,031,640
[45] June 28, 1977

[54] IDENTIFICATION SYSTEM

[76] Inventors: Charles B. Hanna, Jr., 113-B Willow Run, Fayetteville, N.C. 28301; William W. Coleman, 1646 Colony Road, Rock Hill, S.C. 29730

[22] Filed: Dec. 8, 1975

[21] Appl. No.: 638,466

[52] U.S. Cl. ............................. 40/2.2; 40/158 B; 283/7; 428/916
[51] Int. Cl.² .......................................... G09F 3/02
[58] Field of Search ............ 40/2.2, 158 B, 158 R, 40/159, 135; 283/7, 6, 8 R, 12 R; 428/916, 203, 204, 43, 915

[56] References Cited

UNITED STATES PATENTS

| | | | |
|---|---|---|---|
| 1,410,130 | 3/1922 | Sinclair | 40/158 B |
| 2,896,351 | 7/1959 | Johnson | 40/125 A X |
| 3,117,608 | 1/1964 | Goss et al. | 40/2.2 X |
| 3,668,795 | 6/1972 | Barker | 40/2.2 |
| 3,755,935 | 9/1973 | Annenberg | 40/2.2 |
| 3,792,542 | 2/1974 | Cohan | 40/2.2 X |
| 3,810,566 | 5/1974 | Adams | 40/158 B X |
| 3,921,318 | 11/1975 | Calavetta | 283/7 |

Primary Examiner—John F. Pitrelli
Attorney, Agent, or Firm—Wellington M. Manning, Jr.

[57] ABSTRACT

An identification system using radiographs, primarily dental, for positive identification is disclosed and claimed herein. An identification card as will be described hereinafter is provided in the form of one of a number of designs. Each design is preferably provided with a space, location or aperture to receive a radiographic identification means therein. The identification card has a base layer with an aperture or location thereon to receive the radiograph. Adjacent the radiograph is a personal data receiving area. Additionally, other identifying indicia such as a photograph, fingerprint or the like may be utilized in conjunction with the radiograph. The identification system of the present invention is particularly advantageous in the identification of bodies at a mass disaster, such as a plane crash or the like, for teeth will not be destroyed, and in all likelihood, an identification system being carried in a wallet would not be totally destroyed. The teeth of the deceased and the radiograph can thus be compared for positive identification.

5 Claims, 10 Drawing Figures

IDENTIFICATION SYSTEM

BACKGROUND OF THE INVENTION

Identification cards and systems, in general, are in widespread use. Schools, businesses, organizations and the like generally utilize plastic, laminated cards with photographs and personal data to provide a positive identification for the bearer of the card. During evolution of credit card and identification card systems, progress has been made from a plain paper card that is filled out and retained in one's wallet to a sophisticated laminate where a photograph of the bearer is provided along with a preform that bears the personal data, both being positioned between laminar with the composite being heat sealed to form a unitary structure. Such types of identification systems are impervious to water and moisture and are more permanent in nature than their predecessor paper identification cards. Photographs in use in identification systems have provided a suitable positive identification technique in conjunction with credit cards, identification cards or other items used by the bearer for an intended purpose. Likewise, other techniques such as the use of micronegatives, matching physical features, size and shapes of photographs, and the like have been employed to lessen the probability of alteration of cards whereby the identifying means of the bearer have been removed and replaced with a fraudulent substitute. Systems have thus become sophisticated from the standpoint of matching a card to the bearer to positively identify the bearer as one to whom the card had been issued.

The aforementioned techniques are valid and successful in situations where it is desirable to identify the bearer as the owner of the card. Whether a photograph, a fingerprint, a micronegative indicia display, a photograph of a particular shape, or the like is employed, all are suitable for their intended purposes. Since the bearer is available and cogent at the time the card is presented for identification purposes, the matter of true identification can be fairly simple. In situations, however, where the bearer has been injured and is comatose, or has been killed perhaps with partial or substantial destruction of the facial features or substantial destruction of the epidermal body covering, it becomes exceedingly difficult, if not impossible, to utilize conventional identification techniques to positively identify the body.

Teeth due to their structure are not easily destroyed along with other body parts. Even in the circumstance where a body is severely burned, the dental structure or other anatomy around the oral cavity will generally remain in tact. Further, a wallet carried by a person in a mass disaster situation is likely to avoid total destruction due to the multiple layers and to placement of same among articles of clothing in a pocketbook or the like. Hence, a fatality in a plane crash may well be destroyed beyond recognition by visual observation of physical features while the teeth remain in tact along with an identification system. A card produced according to the teachings of the present invention carrying a radiograph could then be used for comparative analysis to positively identify the individual from the structure of the teeth or surrounding anatomy.

The present invention thus represents a definite improvement in the art of identification systems in the area of forensic dentistry. The prior art does not teach or suggest the identification system of the present invention. Exemplary of the prior art are U.S. Pat. Nos. 2,587,022 to Langan; 2,633,654 to Roetger; 2,859,550 to Langan; 3,048,697 to Cavanaugh et al; 3,253,360 to Spicer; 3,571,957 to Cumming et al; 3,668,795 to Barker; 3,805,238 to Rothfjell; 3,827,726 to McVoy et al, and 3,874,979 to Hannon.

SUMMARY OF THE INVENTION

It is an object of the present invention to provide an improved personal identification system.

Another object of the present invention is to provide a personal identification system containing a radiographic insert.

Still another object of the present invention is to provide a personal identification system that may be used for positive identification of a corpse at a mass disaster.

Yet another object of the present invention is to provide an improved identification system utilizing dental records for purposes of positive identification.

Generally speaking, the present invention is directed to an identification card which comprises a base, said base having a personal data receiving area thereon, at least one radiograph located adjacent said base, said radiograph being personal to the bearer of the card; and lamina secured around said base and said radiograph to form a unitary composite therewith.

More specifically, the identification system of the present invention is directed to a card wherein preferably an aperture is provided to receive a radiographic identification means. Radiographs being utilized are preferably dental X-rays that may be used as a means of positive identification of the bearer of the card. The X-rays utilized may be an entire radiographic picture of the bearer's mouth or may be directed to some particular segment of same, such as bite wing X-rays. In addition to the radiographic identification means, which assists in positive identification of a person, a photograph or fingerprint or other physical exterior likeness of the individual may likewise be used in conjunction therewith. In a situation, for example, where a photograph and a dental X-ray are used in combination, the bearer may be readily identified by the photograph. In the case of a fatality, due to some mass disaster or the like, the radiograph of at least a portion of the dental anatomy of the bearer can then be compared with a like area of the corpse to positively identify the corpse as the bearer of the card.

Radiographic identification means according to the present invention may be presented in several arrangements as will be described in more detail hereinafter. Additionally, the identification card could be provided with tactile means thereon to permit easy orientation of the radiographic identification means for reading same. Likewise, since from time to time the dental arrangement of an individual changes due to extractions, fillings, or other dental efforts, these differences may be apparent in a radiographic picture of the oral cavity. It may thus be desirable to provide an identification system where the radiograph can be conveniently removed for reading by a dentist, for a replacement with a more current radiograph or the like.

Radiographs, however, provide a hidden improvement in identification systems. An obvious advantage results in providing the dental picture of the mouth of the bearer. Further improvement results, however, in the use of radiographs to prevent alteration of an identification card. Once the card is produced with the radiograph laminated therein adjacent the base, the lamina cannot then be separated without destruction of the X-ray. During lamination, the surface of the X-ray becomes secured to the laminating fiber. Fiber separation of the film lifts the radiograph from its base and thus destroys the radiograph.

The identification system of the present invention, in general, is therefore a back-up means of identification that is likely to survive destruction in a mass disaster. Such a means of identification is of particular importance in situations where mistaken identity could result. On a battlefield, for example, a means of identification according to the present invention could permit positive identification of a corpse that has been badly mutilated, and thus prevent one from being erroneously listed as missing in action. An insurance company writing large policies on the life of particular individuals could utilize such an identification system in general as well as in a disaster, whereupon the positive identification could be made in the event of normal or accidental death to avoid payment of the policy proceeds upon the death of the wrong person. Many systems could be similarly improved by use of the identification system of the present invention to alleviate or at least substantially lessen human error in identification.

DESCRIPTION OF THE PREFERRED EMBODIMENTS

Figure 1:
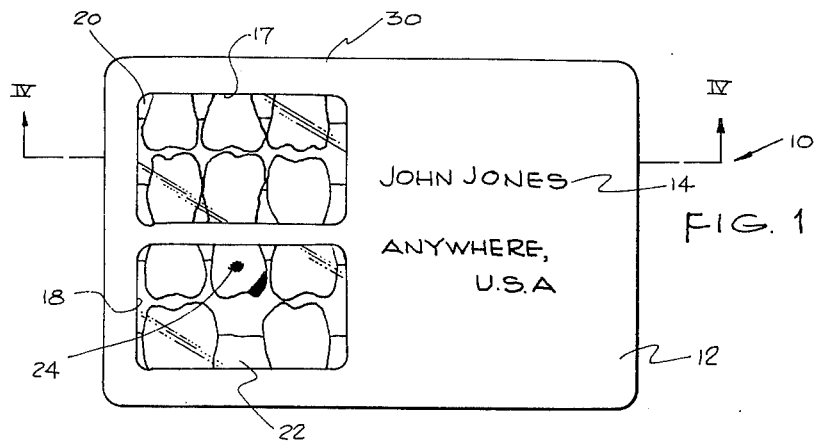
FIG. 1 is a plan view of an identification card according to the teachings of the present invention.
Figure 2:
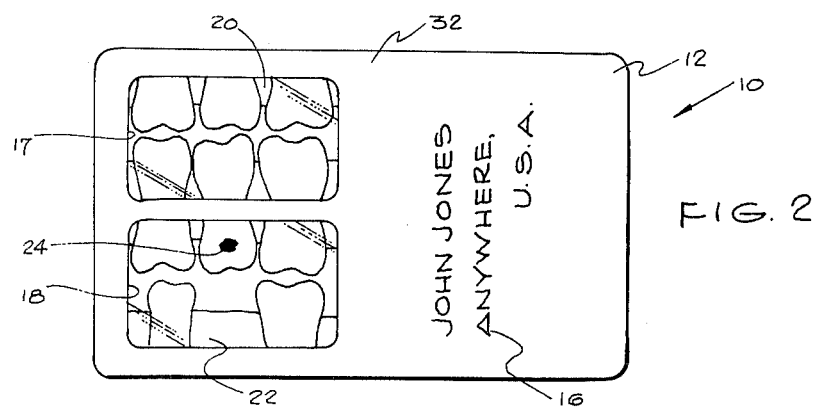
FIG. 2 is a rear plan view of the card as illustrated in FIG. 1.
Figure 4:
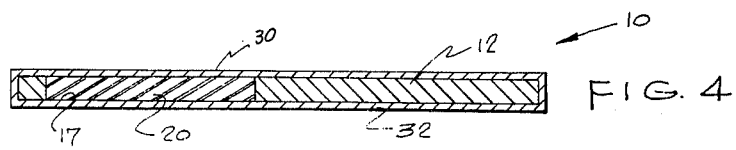
FIG. 4 is a cross sectional view of an identification card according to the teachings of the present invention as shown in FIGS. 1 and 2 and taken along a line IV—IV.

Referring to the Figures, specific embodiments of the present invention will now be described in detail. In FIGS. 1, 2 and 4 there is shown an identification card generally indicated as 10. A core, base, or preform 12 having a personal data receiving area 14 on side with an additional information receiving area 16 on an opposite side thereof. Core 12 further has a pair of apertures 17 and 18 in which are received radiographs 20 and 22 of a portion of the dental anatomy of the bearer of the identification card. Core 12 and radiographs 20 and 22 are encased between thermoplastic sheets 30 and 32. The composite when subjected to proper heat and pressure causes thermoplastic sheets 30 and 32 to fuse and form a seal around the periphery of core 12 and radiographs 20 and 22. A unitary identification product is thus produced. During the heat sealing process, the radiographs 20 and 22 are preferably permanently sealed to an underside of the thermoplastic film. Thereafter, the card cannot be altered without destruction of the radiograph or at least disruption of the radiograph that becomes patently apparent.

As illustrated in FIGS. 1 and 2, with FIG. 2 being the reverse side of the card 10 as shown in FIG. 1, the dental radiographs utilized may represent any desired portion of the dental anatomy of the bearer. A convenient arrangement is to provide left and right bite wing X-rays, which are specific portions of the dental structure of an individual. Likewise, any other particular portion of the dental anatomy of the individual may be utilized so long as same is conventionally understood by a dentist who would need same at a like date. In utilizing radiographs 20 and 22, it is noted that the positive pictures of the bone structure of the teeth are shown which may be used comparatively to positively identify the bearer of the card. Note, for example, in radiograph 20 the particular symmetry of the teeth, whereas, in radiograph 22, a filling 24 is illustrated in a particular tooth, while in a lower layer only two teeth are shown, indicating that a tooth has been extracted therebetween. The absence of teeth as well as the particular shape or condition of the teeth may thus be utilized for positive identification purposes according to the present invention.

Figure 3:
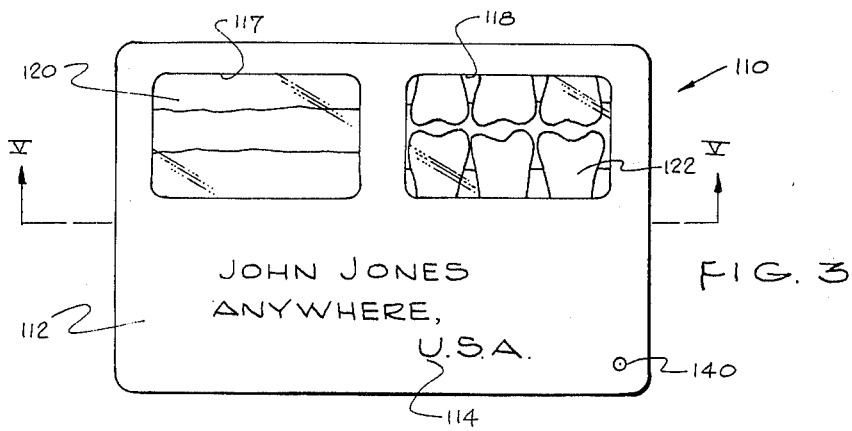
FIG. 3 is a plan view of a further embodiment of the identification system according to the teachings of the present invention.

In FIG. 3, a further embodiment of the present invention is illustrated wherein a card generally indicated as 110 is provided having a core 112 with apertures 117 and 118 being located in a side by side arrangement across the width of the card 110 as opposed to a vertically aligned arrangement as shown in FIGS. 1 and 2. The personal data receiving area 114 is then located below the apertures 117 and 118 where the particular physical characteristics of the bearer may be inscribed. Dental radiographs 120 and 122 are then received in apertures 117 and 118 with a laminar pocket having sheets 130 and 132 placed therearound. Upon receipt of required heat and pressure, a seal is produced around the periphery of core 112 whereby core 112 and radiographs 120 and 122 are encased in a unitary package.

Figure 5:
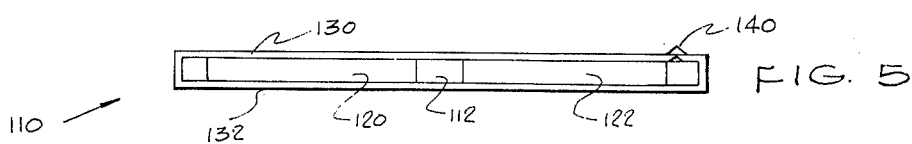
FIG. 5 is a vertical cross section of an identification card according to the present invention showing a further embodiment of same.

A further embodiment of the present invention is illustrated in FIGS. 3 and 5. The card 110 as shown with a core 112 and radiographs 120 and 122 sealed therein is provided with tactile card orientation means. A protrusion 140 has been produced on a side of the card 110. A tactile examination of the card 110 by the reader's finger, enables him to correctly orient the card for reading. In such fashion, a dimple, protrusion, depression or the like 140 may be provided on the identification card 110 to permit orientation of same.

Figure 6:
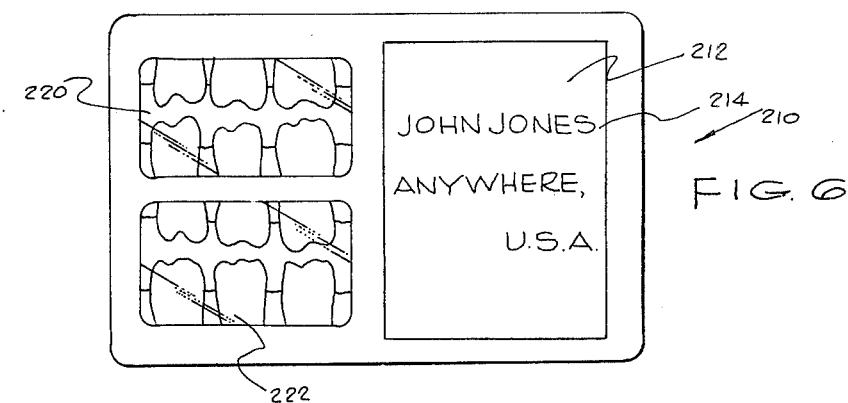
FIG. 6 is a plan view of a further embodiment of an identification card according to the present invention.

In FIG. 6, a card 210 is provided by a base 212 having a personal data information receiving area 214 thereon. A pair of radiographs 220 and 222 are separately displayed adjacent thereto. In a preferred arrangement, as illustrated in FIG. 6, radiographs 220 and 222 are juxtaposed to base 212. With the internal items in juxtaposition, sheets of lamina are placed thereabout. Upon receipt of the needed heat and pressure, a unitary heat sealed item is produced.

Figure 7:
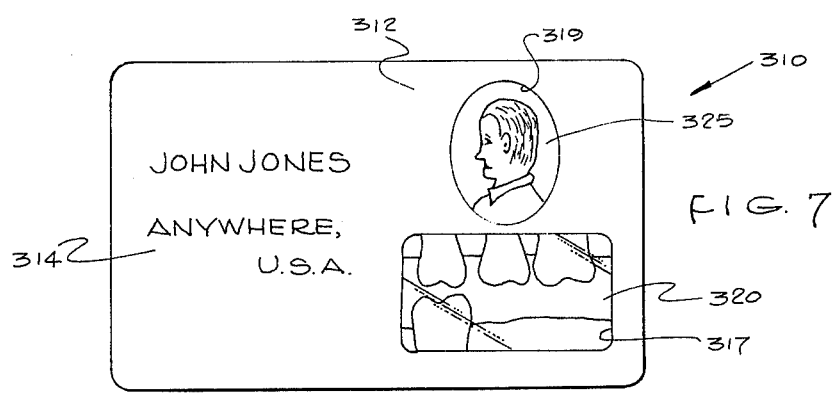
FIG. 7 is a plan view of a still further embodiment according to the present invention, incorporating photographs therein.

FIG. 7 illustrates an embodiment of the present invention wherein an identification card 310 is provided having a core or base 312 with a personal data information receiving area 314 thereon. Base 312 in the embodiment illustrated in FIG. 7 has a first aperture 317 in which is received a radiograph 320 as described hereinbefore. Additionally, a further aperture 319 is provided in base 312 that is preferably oval in shape and receives a like shaped photograph of the bearer of the card 325 therein. In this fashion, the lamina sheets are placed about the base, photograph and radiograph, 312, 325 and 320, respectively, and sealed therearound to form the composite structure. With this particular arrangement, the bearer of the card can be readily identified by his photograph and personal data inscribed on core 312, while for positive identification purposes, the radiograph 320 may be utilized.

Figure 8:
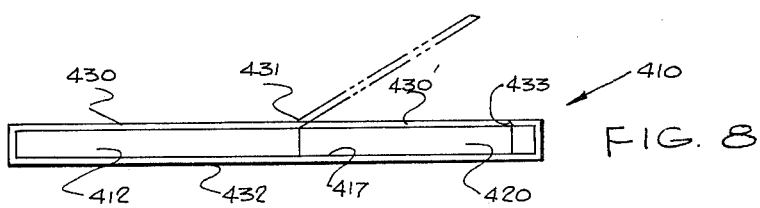
FIG. 8 is a vertical cross sectional view of the embodiment shown in FIG. 6.

FIG. 8 shows a further embodiment of the concept of the present invention such as might be encountered in conjunction with a particular identification card as illustrated in FIG. 7. In FIG. 8, a card 410 is illustrated in cross section having a core 412 that is sealed between lamina 430 and 432. In the embodiment illustrated in FIG. 8, a radiograph 420 is received in a pocket 417 and is not permanently encased as described hereinbefore. Instead, lamina 430 is provided with an integral hinge 431 and a severed portion 433 such that a lid 430' is produced that may be lifted to permit access to radiograph pocket 417 by opening same as shown in phantom. A photograph and personal data information may be utilized on a semi-permanent basis while the radiograph 420 is interchangeable. Should changes be necessary during one's normal vists to a dentist, as is highly possible, a new, current radiograph may be substituted for the old one. The bias of slit 433 must be overcome and lid 430' of lamina 530 is lifted to permit access to pocket 417.

Figure 9:
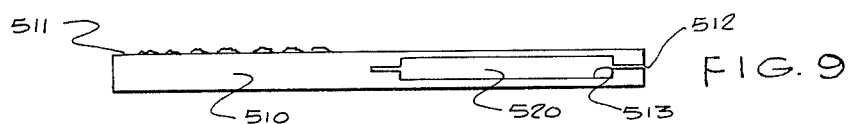
FIG. 9 is a vertical cross sectional view of a further embodiment of the present invention.
Figure 10:
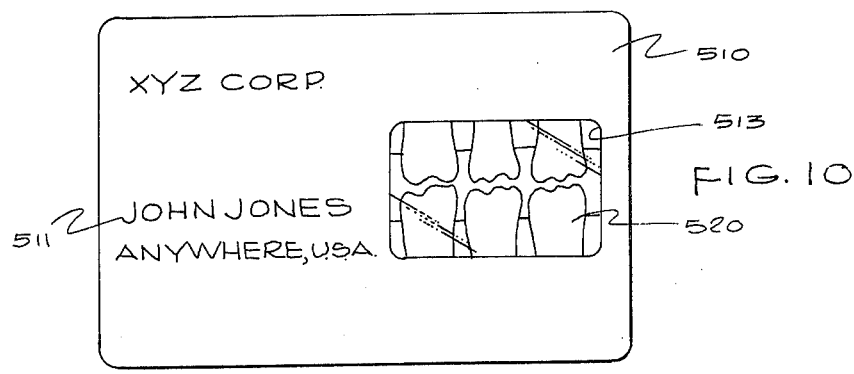
FIG. 10 is a plan view of the embodiment shown in FIG. 9.

In FIGS. 9 and 10, a plastic card of the type utilized for credit cards is illustrated being comprised of body 510 on which the particular information 511 is embossed as is shown in FIG. 10. Card 510 has a slit 512 extending inwardly through one end thereof with a radiograph receiving area 513 being located along slit 511. A radiograph 520 can thus be inserted into the appropriate radiograph receiving area 513 after which the slit 511 may be sealed to permanently encase radiograph 520 in card 510. A conventional credit card may thus be adapted to receive a radiograph, i.e., identification means for positive identification purposes as described herein. In fact, it would not be necessary for the card 510, or for that matter, any of the other cards to be transparent at the point of the radiograph since same could be consealed to preclude any possible deterioration of the radiograph over an extended period of time. A transparent covering is, however, preferred.

Generally the body or base of the identification card is manufactured of paper and the personal data is typed or printed thereon at the appropriate location. Likewise, other information pertaining to the issuing authority, body or the like may be inserted on the body along with any further information that may be desirable. The lamina employed are normally a transparent, thermoplastic, polymer film. The lamina may be in individual sheet form or preformed into packets where the materials to be included are placed within the packet prior to sealing. The aperture into which photographs, radiographs, or the like are to be placed may be cut to a particular shape with the materials to be placed therein being a like shape. Normally, the shapes used discourage any alteration of the card due to difficulty in reproducing the shape without the necessary dies or the like. While numerous embodiments of the present invention have been described hereinabove, it should be pointed out that the various individual features of same are interchangeable and are not restricted to the particular embodiment with which they were described.

Having described the present invention in detail, it is obvious that one skilled in the art will be able to make variations and modifications thereto without departing from the scope of the invention. Accordingly, the scope of the present invention should be determined by the claims appended hereto.

What is claimed is:
1. An improved identification system comprising:
   a. a base of a predetermined thickness, said base having at least one radiograph receiving area therein and a personal data receiving area thereon;
   b. at least one dental radiograph received in said at least one radiograph receiving area, said at least one dental radiograph having a thickness approximating that of said base;
   c. a first sheet of transparent thermoplastic film disposed on one side of said base and radiograph and extending beyond the edges of same, said film being thermally bonded to said radiograph;
   d. a second sheet of transparent thermoplastic film disposed on an opposite side of said base and said radiograph and extending beyond the edges of same, said second sheet of film being thermally bonded to said opposite side of said radiograph and to exposed surfaces of said first sheet of film to totally enclose said base and said radiograph, said thermal bonding between said sheets of film and said sides of said radiograph being sufficient to destroy said radiograph upon delamination of said film; and
   e. tactile orientation means on one of said sheets of film.

2. An improved identification system as defined in claim 1 wherein said base has two apertures thereon, each aperture having a radiograph therein.

3. An improved identification system as defined in claim 1 comprising further a photograph of the bearer adjacent said base.

4. An improved identification system as defined in claim 1 wherein said orientation means is a protrusion on a side thereof, said protrusion identifying a proper side for reading said radiograph.

5. An improved identification system as defined in claim 1 wherein two radiographs are included and comprise left and right bite wing X-rays of the bearer.

* * * * *